United States Patent
Kamran et al.

(10) Patent No.: US 11,005,970 B2
(45) Date of Patent: *May 11, 2021

(54) DATA STORAGE SYSTEM WITH PROCESSOR SCHEDULING USING DISTRIBUTED PEEK-POLLER THREADS

(71) Applicant: EMC IP Holding Company LLC, Hopkinton, MA (US)

(72) Inventors: Lior Kamran, Richon LeZion (IL); Amitai Alkalay, Kadima (IL)

(73) Assignee: EMC IP Holding Company LLC, Hopkinton, MA (US)

(*) Notice: Subject to any disclaimer, the term of this patent is extended or adjusted under 35 U.S.C. 154(b) by 49 days.

This patent is subject to a terminal disclaimer.

(21) Appl. No.: 16/520,922

(22) Filed: Jul. 24, 2019

(65) Prior Publication Data

US 2021/0029219 A1 Jan. 28, 2021

(51) Int. Cl.
*H04L 29/08* (2006.01)
*G06F 3/06* (2006.01)
*G06F 9/54* (2006.01)
*G06F 9/38* (2018.01)

(52) U.S. Cl.
CPC ........... *H04L 67/327* (2013.01); *G06F 3/067* (2013.01); *G06F 3/0625* (2013.01); *G06F 3/0653* (2013.01); *G06F 9/3851* (2013.01); *G06F 9/547* (2013.01); *H04L 67/325* (2013.01)

(58) Field of Classification Search
CPC ... H04L 67/327; H04L 67/325; G06F 3/0653; G06F 9/3851; G06F 9/547; G06F 3/067
See application file for complete search history.

(56) References Cited

U.S. PATENT DOCUMENTS

| 8,589,625 | B2 | 11/2013 | Colgrove et al. | |
|---|---|---|---|---|
| 8,621,184 | B1 | 12/2013 | Radhakrishnan et al. | |
| 8,751,773 | B2 | 6/2014 | Lippett | |
| 2011/0099552 | A1 | 4/2011 | Avni et al. | |
| 2014/0331086 | A1* | 11/2014 | Resch | G06F 11/1458 714/15 |
| 2019/0332328 | A1* | 10/2019 | Yu | G06F 3/0637 |

FOREIGN PATENT DOCUMENTS

WO 2011011156 1/2011

* cited by examiner

*Primary Examiner* — Wing F Chan
*Assistant Examiner* — Billy H Ng
(74) *Attorney, Agent, or Firm* — BainwoodHuang

(57) ABSTRACT

A method of multitasked operation of a data storage node includes executing provider threads of an application, the provider threads distributed among processing cores along with respective peek-poller threads, each provider thread having regular operations of (1) continually polling interfaces of the data storage node for application events requiring processing, and (2) performing processing tasks for the application events until there are no unprocessed additional events for the provider thread, and thereupon entering a sleep state. The method further includes regularly executing the peek-poller threads on the processing cores, each peek-poller thread having operations of (1) checking interfaces of the data storage node for new application events to be processed by respective provider threads currently in the sleep state, and (2) for each new application event, activating the respective provider thread on the respective processing core.

20 Claims, 4 Drawing Sheets

DATA STORAGE SYSTEM WITH PROCESSOR SCHEDULING USING DISTRIBUTED PEEK-POLLER THREADS

BACKGROUND

The present invention is related to the field of data storage systems, and in particular to the scheduling of a block-storage application executed in a data storage system.

SUMMARY

A method of multitasked operation of a data storage node of a data storage system includes executing provider threads of an application, the provider threads being distributed among corresponding processing cores of the data storage node along with respective peek-poller threads. Each provider thread has regular operations upon becoming activated on a respective processing core of (1) continually polling respective interfaces of the data storage node for application events requiring processing, and (2) performing processing tasks for the application events until there are no unprocessed additional events for the provider thread, and thereupon entering a sleep state. The method further includes regularly executing the peek-poller threads on the respective processing cores, each peek-poller thread having operations of (1) checking interfaces of the data storage node for new application events to be processed by respective provider threads currently in the sleep state, and (2) for each new application event, activating the respective provider thread on the respective processing core.

In one embodiment the first application is a block-storage application and the provider threads are block threads each including a respective set of 10 providers for performing the polling of the respective interfaces, and the block-storage application includes respective inner schedulers executed on the processing cores, each including a respective peek-poller thread.

The mechanism allows an application to utilize CPU cores in correlation to a user pattern, rather than constantly consume 100% utilization, allowing another application to utilize remaining CPU cycles. Also, by distributing the peek-poller threads among all the cores, the technique avoids any need to dedicate one or more cores for performing peek-poller functionality, thus avoiding potential loss of available CPU power.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
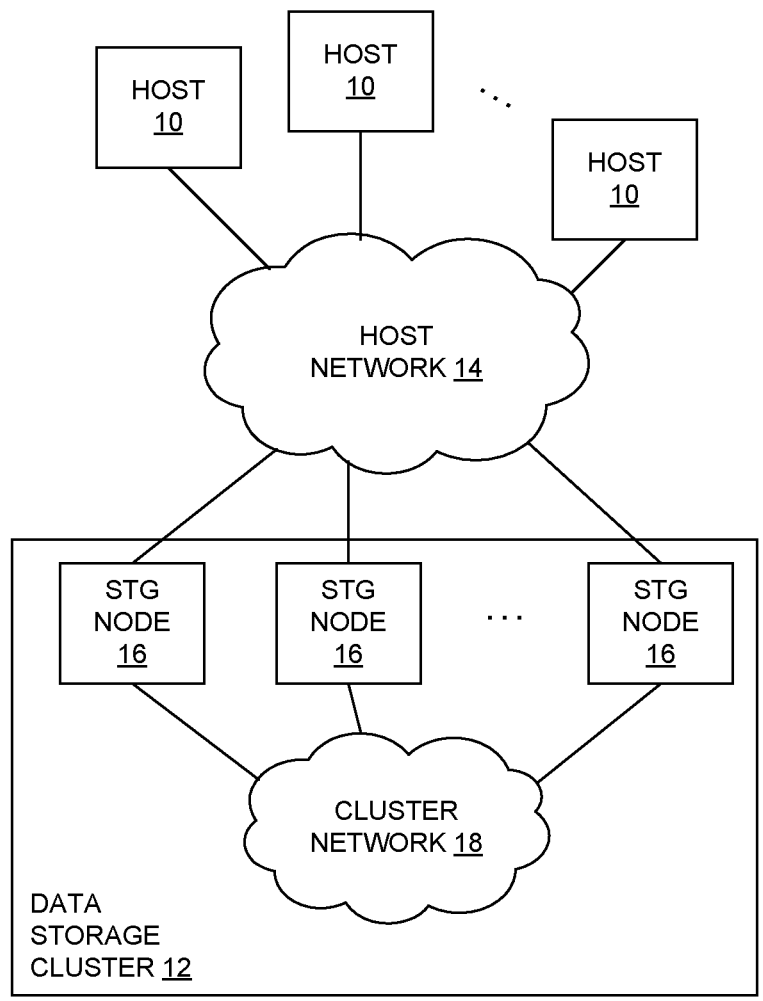
FIG. 1 is a block diagram of a computing system including a cluster of data storage nodes.

Described herein is a distributed storage system with storage nodes that are connected together in a network and may be managed by a separate system manager. Each storage node includes one or more multi-core CPUs and is running a Block application that creates a single hard-affined OS-thread (called a block thread) per every CPU core, which implements block-storage functionality. As part of its operation, each block thread always polls its interfaces for new events. For example, it polls for completions of submitted 10 requests to back-end storage devices, and polls for new 10 requests from separate host computers. Therefore, each block thread by design would fully utilize the CPU core it's running on, because even when it has no work to do it stays busy polling for new events.

A data storage node may also run one or more other applications, for example a File application that provides a File interface to the host computers. The Block and the File applications may be used simultaneously for example, each with a different load that can dynamically change over time. For good overall performance, the data storage node preferably can dynamically adapt to the user operation pattern of the two (or more) applications.

However, since the Block application employs block threads that are running on all CPU cores and would utilize 100% of those cores in the absence of other limits, such a requirement for dynamic adaptation in executing both the Block application and Other application is not straightforward. For example, a scenario can be imagined in which only the Other application is used but can use only up to 50% of the CPU, with the other 50% used just for Block polling.

Thus a scheduling architecture is used to create an event-driven storage system out of the always-polling model, enabling the multitasking of the Block application with other applications such as a File application along with dynamic adaptation to user operation pattern. Additionally, a CPU sharing mechanism is incorporated in inner schedulers of individual block threads executed on each processor core. The CPU Sharing functionality is executed when the block thread switches between sub-threads referred to as "provider threads". The CPU sharing functionality includes:

1. A CPU release decision—where the block thread checks if it's time to release its CPU core and allow other application(s) (e.g., File application) to utilize its CPU core.
2. A Peek-Poller thread, which quickly examines ("peeks") at all the interfaces for all the other block threads (of all cores) that are currently suspended (i.e. they released their CPU core), and activate those block threads for which events have occurred The mechanism allows the block application to utilize the CPU cores in correlation to the user pattern, rather than constantly consume 100% utilization, allowing the other application (e.g., File application) to utilize the remaining CPU cycles. Also, by distributing the Peek-Poller threads among all the cores, the technique avoids any need to dedicate one or more cores for performing peek-poller functionality, thus avoiding potential loss of available CPU power.

The release decision checks if all in-flight operations of the block thread are currently in a waiting state (e.g. waiting for a completion from the Disk Array, waiting for RDMA transfer completion etc.), to decide to release the CPU, letting the other application use those CPU cycles, until a Peek-Poller from any other block thread wakes it up again.

The release decision can also take into account the continuous running duration of the block thread, and if this duration exceeds a threshold, it means that the other applications are starved (not allowed to run for a long time), and decide to release the CPU even when there are still in-flight operations.

The Peek-Poller "peeking" cycle should be very fast so it could detect new events as soon as they arrive and wake up the corresponding block threads. Therefore, the Peek-Poller only checks (peeks) for new events in all interfaces, but it doesn't fetch anything from them.

After waking up, the block thread will resume to its normal flow of execution i.e. poll its interfaces, fetch new events and process all the work that derive from them. When the block thread wakes up, it resumes to the exact running model as before, which means the performance is very similar. The life cycle the block threads is a combination of an event driven model and a polling model, because after the block thread wakes up due to an event, it resumes its normal operation of polling until it releases the CPU and wait again.

To avoid a deadlock situation that could arise if all block threads released their CPU core so there is no running block thread that can execute the Peek-Poller to wake up any block threads, at least one block thread should always be running. Therefore, the CPU release decision should also check this condition and not release the CPU if all the other block threads are currently suspended.

The disclosed technique can also enable a data storage system to be deployed with or without the other application(s). When a system has only the Block application it can operate entirely in the polling-only mode, by simply activating all the block threads and disabling the CPU sharing functionality. For operation with one or more other applications, the CPU sharing functionality simply has to be enabled. This flexibility is a significant characteristic of the solution.

EMBODIMENTS

FIG. 1 shows a computing system having a plurality of host computers (Hosts) 10 coupled to a data storage cluster 12 by a first network shown as a host network 14. As shown, the data storage cluster 12, also referred to herein as simply "cluster" 12, includes a set of individual storage (STG) nodes 16 each connected to the host network 14 and coupled together by a second network shown as a cluster network 18. Each storage node 16 includes data storage media such as flash-programmable semiconductor memory ("flash"), along with specialized interface and processing circuitry providing for storage command processing and other functionality. Additional details of the cluster 12 are described below. At a high level, the cluster 12 provides secondary storage services to the hosts 10, i.e., the persistent storage of data accessed as secondary storage (in contrast to primary memory), the retrieval of stored data, and other related services (e.g., compression, de-duplication) as generally known in the art. The clustering of the storage nodes provides an ability for host I/O requests to be forwarded from one storage node 16 to another, which provides a variety of system-level possibilities and benefits as also generally known in the art.

Figure 2:
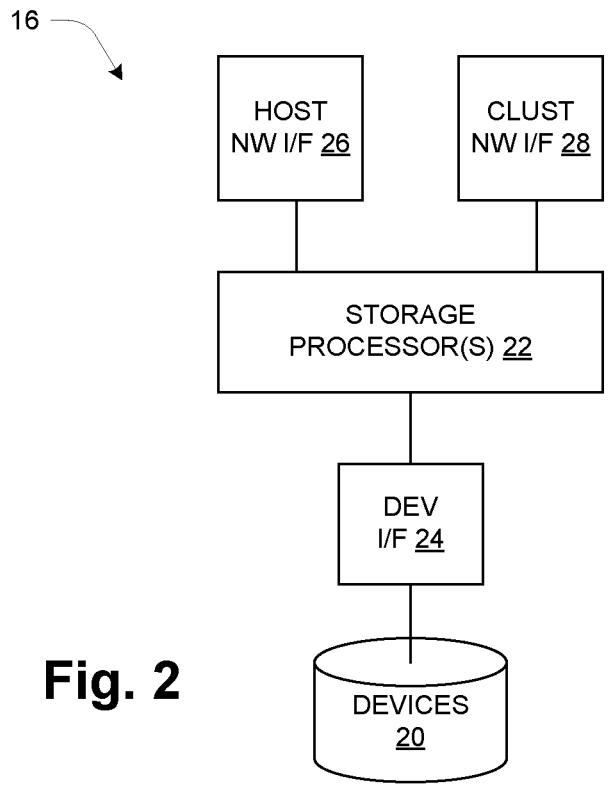
FIG. 2 is a block diagram of a storage node.

FIG. 2 shows structure of a storage node 16. As mentioned, data storage is provided by storage media which is shown as "devices" 20, reflecting a logical organization of raw semiconductor data storage into logical storage devices analogous to magnetic disks. A set of storage processors 22 provide the primary functionality of writing/reading data to/from the devices 20 in response to storage I/O requests received from the hosts 10 or other storage nodes 16 of the cluster. The storage node 16 further includes device interface circuitry (DEV I/F) 24 that interfaces the storage processors 22 to the devices 20; host network interface circuitry (HOST NW I/F) 26 that interfaces the storage processors to the host network 14 (FIG. 1); and cluster network interface circuitry (CLUST NW I/F) 28 that interfaces the storage processors 22 to the cluster network 18 (FIG. 1). In operation, storage I/O requests are received by the host network interface 26 and the cluster network interface 28 and signaled to the storage processors 22, which process the requests to carry out the corresponding operations. For read requests, the requested data is obtained and returned to the requestor, while for writes the data is written to storage and then acknowledged to the requestor. As mentioned, the storage processors 22 may maintain a volatile in-memory storage cache which is used to satisfy both the read and write requests. Read misses require obtaining an extent of data from a device 20 and storing it into the cache for satisfying the current read request as well as future read requests for other data of the extent. For writes, the cache serves as a buffer, and a background process is used to destage buffered write data to the devices 20 as necessary. Also as generally known, the storage processors 22 may provide a variety of higher-level functions in addition to basic read and write data storage operations as described above. These include compression, de-duplication, RAID and other forms of redundancy, etc.

Figure 3:
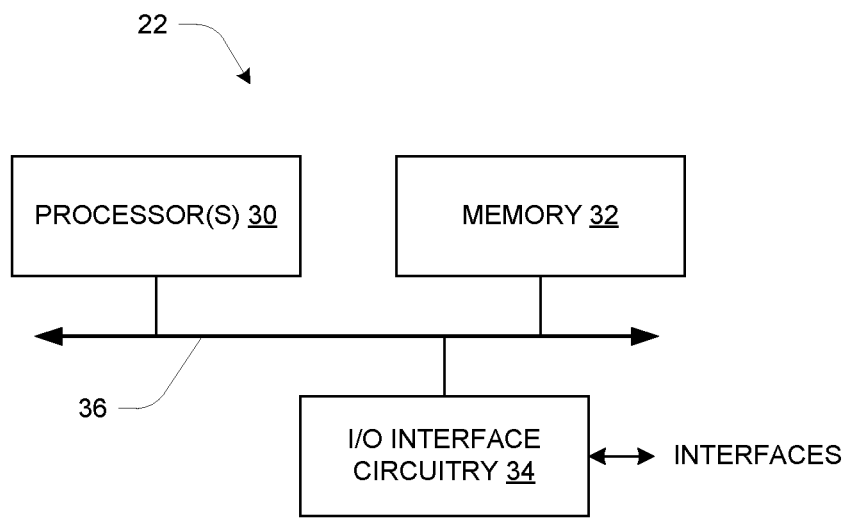
FIG. 3 is a block diagram of a storage processor from a computer hardware perspective.

FIG. 3 shows an example configuration of a storage processor 22 from a computer hardware perspective. The hardware includes one or more processors 30, memory 32, and interface circuitry 34 interconnected by data interconnections 36 such as one or more high-speed data buses. The interface circuitry 34 provides hardware connections to the interfaces 24, 26, and 28 (FIG. 2). The processor(s) 30 with connected memory 32 may also be referred to as "processing circuitry" herein. In operation, the memory 32 stores data and instructions of system software (e.g., operating system) and one or more application programs which are executed by the processor(s) 30 to cause the hardware to function in a software-defined manner. Additional information about application-related structure and functionality are described below. Application software (including an operating system) may be stored on a non-transitory computer-readable medium such as an optical or magnetic disk, Flash memory or other non-volatile semiconductor memory, etc., from which it is retrieved for execution by the processing circuitry, as generally known in the art.

Figure 4:
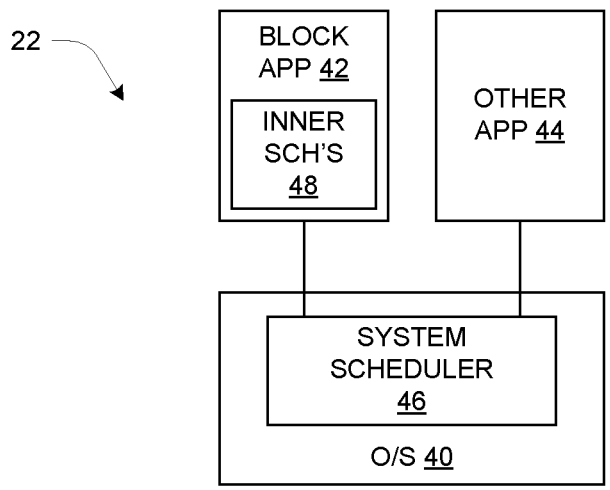
FIG. 4 is a high-level block diagram of a storage processor from a software perspective.

FIG. 4 illustrates software-related structure of a storage processor 22, including an operating system (O/S) 40, a Block application (APP) 42, and an Other application 44. The term "block" in "Block application" refers to the view of secondary storage as a linear, addressable array of fixed-sized blocks (e.g., 4 Kb), along with the use of block-oriented storage protocols such as iSCSI or FibreChannel in the networks 14, 18. This is in contrast to other views of secondary storage, notably a file-based view in which the data is organized into a system of variable-size "files", each being a linear array of bytes. In one embodiment, the Other application 44 is a File application that is based on a file view of stored data, i.e., presenting a file interface to the hosts 10 and using a file-based protocol over the host network 14.

As shown, the operating system 40 includes a system scheduler 46, and the Block application 42 includes a set of inner schedulers (SCH'S) 48. These components operate together to provide a technique of managing multitasking in the storage node 16. Details are provided below.

Figure 5:
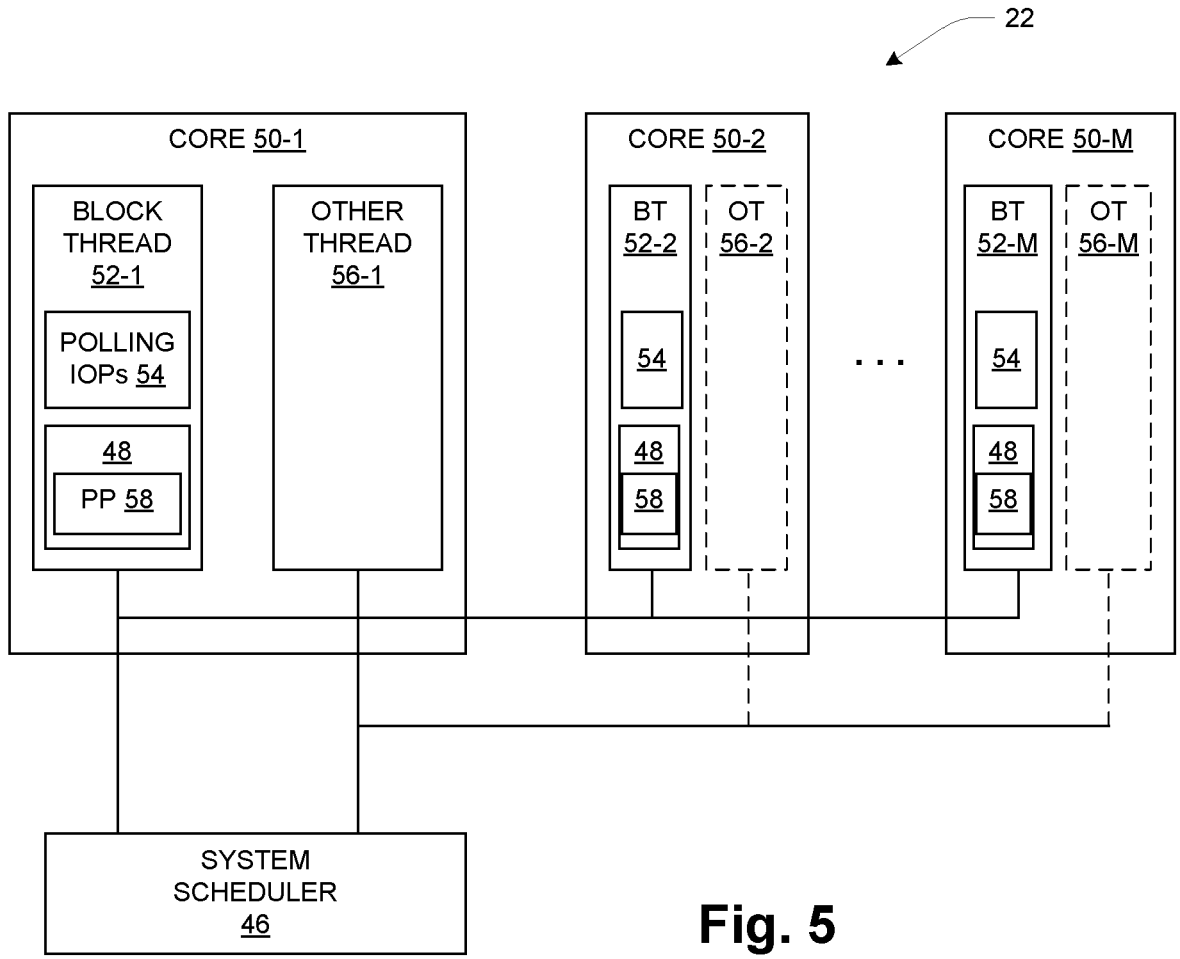
FIG. 5 is a more detailed functional block diagram of a storage processor.

FIG. 5 illustrates additional structure of a storage processor 22, namely its inclusion of a plurality of processing cores 50 (shown as 50-1, 50-2, etc.). As generally known, the cores 50 are distributed among one or more multi-core CPU integrated circuits, a detail that is omitted in FIG. 5. Each core 50 includes a respective instance of a block thread (BT) 52, which is a processing thread implementing functionality of the Block application 42. Each block thread 52 includes a respective set of polling I/O providers (IOPs) 54, which are described below. In general, the cores 50 also execute one or more instances of an "other" thread (OT) 56 which is a thread of the Other application 44 (such as a File application, as described above). Dashed lines indicate the possible non-presence of the other thread 56 at some of the cores 50. Also, a system may be operated with only the block application 42. In the description below, operation of an individual block thread 52 is described, and it will be understood that this applies to each of the individual core-affined instances of block threads 52-1, 52-2, etc.

As shown in FIG. 5, the block threads 52 each include a respective inner scheduler 48, and the system scheduler 46 has functional connections to the block threads 52 and the other threads 56; these connections support the scheduling functionality as described herein. In this respect each per-core instance of the inner scheduler 48 includes a respective peek-poller (PP) thread 58, whose functionality is described more below. The system scheduler 46 is shown apart from the cores 50, which reflects that it need not be core-affined nor even multi-instanced, notwithstanding that like all the operating software it too is executed by program execution circuitry of one or more cores 50. In addition to the specific scheduling involving the block threads 52 as described herein, it will be understood that there is concomitant general scheduling of usage of the cores 50 by other software components, including for example the other threads 56 and the system scheduler 46. Such general, separate scheduling may be conventional and is not elaborated herein.

Thus the Block application 42 is executed as a set of hard-affined block threads 52 per each CPU core 50, which implements the block functionality. As part of its operation, each block thread 52 (specifically, the IOPs 54) always polls its interfaces for new events; for example it polls for completions of submitted IO requests to the devices 20, and polls for new IO requests from the hosts 10 or other storage nodes 16. Therefore, each block thread 52 by design would fully utilize the CPU core 50 that it is running on, because even when there's no actual work, it always keeps checking its interfaces. This design is optimized for a storage system that requires low latency and high I/O rate (I/O per second or IOPS), as there are no context switches and no interrupts involved.

More specifically, each block thread 52 includes a set of IO providers (IOPs) 54 which are responsible for polling respective interfaces. The following lists the interfaces and their corresponding IO-Providers 54:

1. Front-End: The interface for receiving (and replying to) IO requests from a host, via the host network interface 26 (FIG. 2). A Front-End IO-Provider (one of the IOPs 54) polls for new IO requests.
2. RPC Messaging: The interface for sending/receiving messages to/from other storage nodes 16, via the cluster network interface 28 (FIG. 2). An RPC Messaging IO-Provider (one of the IOPs 54) polls for new messages from other storage nodes 16 in the system.
3. RDMA Messaging: The interface for remote direct memory access (RDMA) transfer of buffers between storage nodes 16, via the cluster network interface 28 (FIG. 2). An RDMA Messaging IO-Provider (one of the IOPs 54) polls for the completion of RDMA transfers.
4. Back-End: The interface for accessing the Disk Array e.g. Read/Write IOs to the devices 20, via the device interface 24 (FIG. 2). A Back-End IO-Provider (one of the IOPs 54) polls for completion of read/write requests initiated by the block thread 52 to the devices 20.

In addition to the Block application 42, a storage node 16 may be required to run another application 44, for example a File application (i.e. another process, perhaps in a different OS container) that provides a File interface to users of the system (i.e., to the hosts 10). The storage system use patterns may dynamically change over time. Thus, the system may use only the Block application 42 for some time and then use only the File application 44, or it may use both of them simultaneously, each with a different load that can also change. Therefore, the storage system is preferably able to dynamically adapt to the user operation pattern of the two applications to support dynamic load balancing.

However, since the Block application 42 uses block threads 52 that are running on all CPU cores 50 that would use 100% of the cores 50 absent any limitation, such a requirement is not straightforward to meet. For example, it can be imagined that an O/S scheduler might assign equal shares of processing resources to the Block application 42 and the Other application 44. In a scenario in which only the Other application 44 is being used, it could utilize only up to 50% of the processing capacity of a storage processor 22, and the other 50% would be used just for Block polling. Such a technique would not make very efficient use of the available processing resources.

Thus a more complex and dynamic scheduling architecture is used that effectively creates an event driven storage system out of the always-polling model employed by the block threads 52, enabling the multitasking of the Block application 42 with one or more Other applications 44 and dynamic adaptation to user operation pattern. The technique includes use of the inner schedulers 48 and peek-poller threads 58 that are responsible for waiting for new events from respective interfaces, detecting which block threads 52 the events refer to, and waking up (i.e., activating) those block threads 52. Thus in this approach, the block threads 52 actively yield or suspend execution under certain conditions and wait for the peek-poller threads 58 to wake them up. This feature is described more below.

The peek-poller threads 58 preferably do not perform any substantive work of the Block application 42, but rather their responsibility is limited to understanding which block thread 52 should handle each new event and waking up that block thread 52. After waking up, a block thread 52 resumes its normal flow of execution, i.e., it polls its interfaces, fetches new events and process all the work that derives from them. Thus, performance is similar to a system employing block threads that fully own the cores 50 on which they execute, i.e., a system having the block application 42 but no other application 44. In the presently disclosed system, as long as a block thread 52 is running, new events arriving for that block thread 52 are fetched and handled by the block thread 52 (specifically by its IOPs 54) without any intervention of a peek-poller thread 58 or the system scheduler 46.

When all in-flight operations of a block thread 52 are in a waiting state (e.g. waiting for a completion from a device 20, waiting for RDMA transfer completion, etc.), the block thread 52 conditionally releases the associated core 50, which can enable the system scheduler 46 to assign the Other application 44 to use the core 50 until the block thread 52 is awakened again. The operation of the block threads 52 is a combination of an event driven model and a polling model, because after a block thread 52 wakes up due to an event, it resumes its normal operation of polling until it releases the core 50 and awaits a subsequent wake-up by a wakeup thread 48. Additional detail is provided below.

Figure 6:
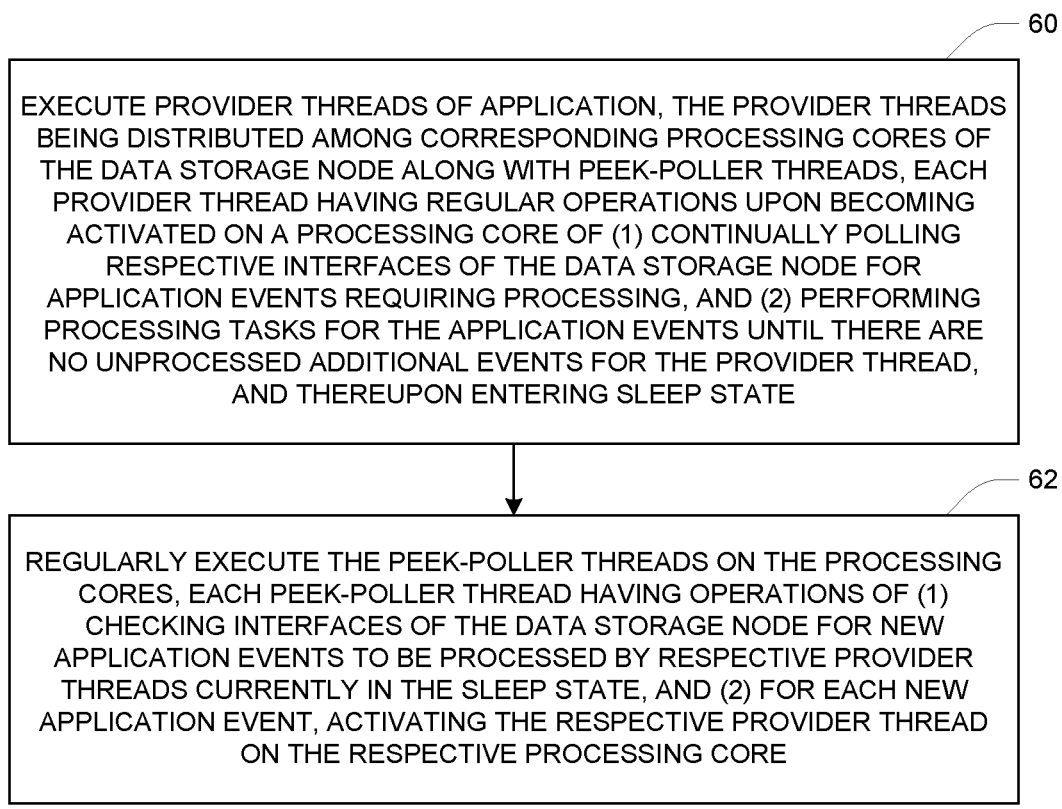
FIG. 6 is a high-level flow diagram of scheduling operation of a storage processor.

FIG. 6 is a high-level flow diagram of pertinent scheduling operation for multitasked operation of a data storage node (e.g., 16) of a data storage system (e.g., 12). At 60, provider threads (e.g., 54) of an application (e.g., block application 42) are executed, wherein the provider threads are distributed among corresponding processing cores (e.g., 50) of the data storage node along with respective peek-poller threads (e.g., 58). Each provider thread has regular operations upon becoming activated on a respective processing core of (1) continually polling respective interfaces of the data storage node for application events requiring processing, and (2) performing processing tasks for the application events until there are no unprocessed additional events for the provider thread, and thereupon entering a sleep state. As described more below, the transition into sleep state for a given block thread 52 may involve logic that is part of the corresponding inner scheduler 48.

At 62, the peek-poller threads are regularly executed on the respective processing cores. Each peek-poller thread has operations of (1) checking interfaces of the data storage node for new application events to be processed by respective provider threads currently in the sleep state, and (2) for each new application event, activating the respective provider thread on the respective processing core.

In the operations at 62, the peek-poller threads 58 activate per-core block threads 52 based on the interface events that the peek-poller threads 58 learn of, and the per-core block threads 52 respond to being activated (or woken up) by conducting their regular polling and processing. For this operation, the peek-poller threads 58 have access to event data that describes which block thread 52 is performing the processing with which the event is associated. Thus, if the event is return of read data from a device 20 for example, then the event data identifies which thread 52 initiated the device read operation. A peek-poller 58 uses this data to identify the specific block thread 52 to wake up based on each specific event that has occurred. In general, each peek-poller thread 58 can wake up any block thread 52 in the system, notably including those on other cores 50. Once a block thread 52 is activated, its regular polling (using its IOPs 54) identifies both the event that has triggered activation and any other events that have occurred or that occur during this execution instance, and each event is processed either to completion or to a next stage where additional waiting is required. For those tasks awaiting subsequent events, the above-mentioned event data is updated to associate an expected event with the specific block thread 52 that is performing the associated processing, to enable a peek-poller thread 58 to identify the correct block thread 52 when the event later occurs. Once a block thread 52 has completed processing of identified events and its polling indicates that there are no additional events to be processed, then the block thread 52 suspends itself and yields the core 50 back to the system scheduler 46 for potential use by the Other application(s) 44.

The following pseudo-code snippets demonstrate logic of the inner schedulers 48:

```
1. High-level logic
While (TRUE) {
    IOP = pick_next_IOP_to_run( )
    schedule(IOP)
    If (CPU sharing is enabled) {
        CPU_sharing_functionality( )
    }
}
2. CPU_sharing_functionality
// Peek-Poller functionality to wake-up block threads
For each block thread BT_i {
    If (BT_i is suspended) {
        Result = Peek_Front_End_interface(BT_i)
        If (Result == TRUE)
            Wake_Up(BT_i)
        Result = Peek_RPC_Messaging_interface(BT_i)
        If (Result == TRUE)
            Wake_Up(BT_i)
        Result = Peek_RDMA_Messaging_interface(BT_i)
        If (Result == TRUE)
            Wake_Up(BT_i)
        Result = Peek_Back_End_interface(BT_i)
        If (Result == TRUE)
            Wake_Up(BT_i)
    }
}
// CPU release decision
If ((no in-flight operations on this core) OR (BT running time > threshold)) {
    If (Not all other BTs are suspended) {
        Release the CPU
    }
}
```

In the above, the CPU sharing functionality is executed only if CPU sharing is enabled. This may be a configurable setting under the control of system software and/or an administrator, for example. This setting can be used to disable CPU sharing when the system is deployed for block-only use, as briefly mentioned above.

Preferably, a block thread 52 that is executing cannot be preempted by the system scheduler 46, but rather continues to run until it voluntarily yields the respective core 50, even if the Other application 44 is ready to run. In addition, it is preferred that when a waiting block thread 52 becomes ready to run after being awakened by a peek-poller thread 58, the system scheduler 46 immediately preempts the Other application 44 if running and schedules the ready block thread 52. To ensure these requirements, the operating system scheduling policy for the Block application 42 is preferably configured with a priority higher than the priority of the other (File) application 44. This configuration ensures that the system scheduler 46 always allows a ready block thread 52 to run until it voluntarily releases the core 50.

The disclosed technique enables the Block application 42 to utilize the CPU cores 50 in correlation to the user pattern, rather than constantly consume 100% utilization, and allows the Other application(s) 44 to utilize remaining CPU cycles. Thus for example, if the Block application 42 consumes 20% of each block thread 52, the File application 44 will be able to utilize the remaining 80% of each block thread 52.

Additional Improvements

The disclosed technique utilizes a per-core inner scheduling mechanism 48 in two ways:

1. To execute the Peek-Poller functionality 58 frequently enough so that a block thread 52 will be woken up as soon as new work arrives.
2. To reach the decision point where the block thread 52 checks the condition to release the CPU, so that the other applications 56 won't be starved.

For additional robustness, it may be helpful to also use an additional "Keeper Peek-Poller" thread that is run periodically, for example every 50 us, and that does actual work (peeking and waking up block threads 52) only if it detects that no other block thread 52 performed peeking for some time. Normally, the Keeper thread will do nothing, but in the case that there is an unusually long delay in activating at least one block thread 52, the Keeper will limit that delay.

Alternatives

Although the description herein is directed to use of a block-storage application as a particular example of a polling-based application, it will be appreciated that the disclosed technique may be applicable to other types of polling-based applications. Additionally, in alternative embodiments the polling may be done using mechanisms other than the per-interface IOPs as described above.

While various embodiments of the invention have been particularly shown and described, it will be understood by those skilled in the art that various changes in form and details may be made therein without departing from the scope of the invention as defined by the appended claims.

What is claimed is:

1. A method of multitasked operation of a data storage node of a data storage system, comprising:

executing provider threads of an application, the provider threads being distributed among corresponding processing cores of the data storage node along with respective peek-poller threads, each provider thread having regular operations upon becoming activated on a respective processing core of (1) continually polling respective interfaces of the data storage node for application events requiring processing, and (2) performing processing tasks for the application events until there are no unprocessed additional events for the provider thread, and thereupon entering a sleep state; and regularly executing the peek-poller threads on the respective processing cores, each peek-poller thread having operations of (1) checking interfaces of the data storage node for new application events to be processed by respective provider threads currently in the sleep state, and (2) for each new application event, activating the respective provider thread on the respective processing core.

2. The method of claim 1, wherein:

the application is a block-storage application and the provider threads are block threads each including a respective set of IO providers for performing the polling of the respective interfaces; and the block-storage application includes respective inner schedulers executed on the processing cores, each including a respective peek-poller thread.

3. The method of claim 2, wherein the interfaces of the data storage node include (1) a device interface to a data storage medium of the data storage node structured as logical storage devices, (2) a host network interface to a host network and host computers connected thereto, and (3) a cluster network interface to a cluster network interconnecting the data storage node with other data storage nodes of the data storage system, and wherein the set of IO providers includes (a) a front-end IO provider operative to poll the host network interface for new IO requests, (b) an RPC messaging IO provider operative to poll the cluster network interface for new messages from other data storage nodes 16 in the system, (c) an RDMA messaging IO provider operative to poll the cluster network interface for completion of remote DMA (RDMA) transfers, and (d) a back-end IO provider operative to poll the device interface for completion of IO requests initiated by the block thread to storage devices of the data storage node.

4. The method of claim 1, wherein the application is a first application, and further including, by a system scheduler, observing scheduling rules including (1) that a provider thread that is executing does not get preempted even when a thread of a second application is ready to run, and (2) that a thread of the second application that is executing is preempted by a waiting provider thread that has become ready to run after being awakened.

5. The method of claim 4, wherein a scheduling policy for the first application is configured with a priority higher than a priority of the second application, ensuring that the scheduling allows a ready provider thread to run until it voluntarily releases the respective processing core.

6. The method of claim 1, wherein entering the sleep state includes executing a release decision that checks if all in-flight operations of the block thread are currently in a waiting state to decide to release the processing core.

7. The method of claim 6, wherein the release decision also takes into account a continuous running duration of the block thread, and if the running duration exceeds a predetermined threshold, then releasing the processing core even if not all in-flight operations are in waiting state, to prevent starvation if another application.

8. The method of claim 6, wherein the release decision further checks whether there is at least one other block thread not suspended as a condition to releasing the processing core, to avoid a deadlock situation in which there is no running block thread that can execute a peek-poller thread to wake up any block threads.

9. The method of claim 1, further including, as a condition to executing the peek-poller threads, checking whether a configurable setting has a value that enables processor core sharing, and executing the peek-poller threads only when the configurable setting has the sharing-enabling value.

10. The method of claim 1, further including regularly executing a keeper peek-poller thread that monitors for an unusually long delay in activating at least one peek-poller thread, and conditionally performing the checking and activating when none of the peek-poller threads has performed the checking and activating for a long delay time.

11. A data storage node for use in a data storage system, comprising:
  data storage devices for persistent secondary storage of data;
  a set of interfaces including at least a front-end interface to a host computer network and a device interface to the data storage devices; and
  a storage processor including a plurality of processing cores, the storage processor executing computer program instructions of an application, the execution of the computer program instructions causing multitasked operation of the data storage node including:
    executing provider threads of an application, the provider threads being distributed among corresponding processing cores of the data storage node along with respective peek-poller threads, each provider thread having regular operations upon becoming activated on a respective processing core of (1) continually polling respective interfaces of the data storage node for application events requiring processing, and (2) performing processing tasks for the application events until there are no unprocessed additional events for the provider thread, and thereupon entering a sleep state; and
    regularly executing the peek-poller threads on the respective processing cores, each peek-poller thread having operations of (1) checking interfaces of the data storage node for new application events to be processed by respective provider threads currently in the sleep state, and (2) for each new application event, activating the respective provider thread on the respective processing core.

12. The data storage node of claim 11, wherein:
  the application is a block-storage application and the provider threads are block threads each including a respective set of IO providers for performing the polling of the respective interfaces; and
  the block-storage application includes respective inner schedulers executed on the processing cores, each including a respective peek-poller thread.

13. The data storage node of claim 12, wherein the interfaces of the data storage node include (1) a device interface to a data storage medium of the data storage node structured as logical storage devices, (2) a host network interface to a host network and host computers connected thereto, and (3) a cluster network interface to a cluster network interconnecting the data storage node with other data storage nodes of the data storage system, and wherein the set of IO providers includes (a) a front-end IO provider operative to poll the host network interface for new IO requests, (b) an RPC messaging IO provider operative to poll the cluster network interface for new messages from other data storage nodes 16 in the system, (c) an RDMA messaging IO provider operative to poll the cluster network interface for completion of remote DMA (RDMA) transfers, and (d) a back-end IO provider operative to poll the device interface for completion of IO requests initiated by the block thread to storage devices of the data storage node.

14. The data storage node of claim 11, wherein the application is a first application, and further including, by a system scheduler, observing scheduling rules including (1) that a provider thread that is executing does not get preempted even when a thread of a second application is ready to run, and (2) that a thread of the second application that is executing is preempted by a waiting provider thread that has become ready to run after being awakened.

15. The data storage node of claim 14, wherein a scheduling policy for the first application is configured with a priority higher than a priority of the second application, ensuring that the scheduling allows a ready provider thread to run until it voluntarily releases the respective processing core.

16. The data storage node of claim 11, wherein entering the sleep state includes executing a release decision that checks if all in-flight operations of the block thread are currently in a waiting state to decide to release the processing core.

17. The data storage node of claim 16, wherein the release decision also takes into account a continuous running duration of the block thread, and if the running duration exceeds a predetermined threshold, then releasing the processing core even if not all in-flight operations are in waiting state, to prevent starvation if another application.

18. The data storage node of claim 16, wherein the release decision further checks whether there is at least one other block thread not suspended as a condition to releasing the processing core, to avoid a deadlock situation in which there is no running block thread that can execute a peek-poller thread to wake up any block threads.

19. The data storage node of claim 11, wherein the multitasked operation further includes, as a condition to executing the peek-poller threads, checking whether a configurable setting has a value that enables processor core sharing, and executing the peek-poller threads only when the configurable setting has the sharing-enabling value.

20. The data storage node of claim 11, wherein the multitasked operation further includes regularly executing a keeper peek-poller thread that monitors for an unusually long delay in activating at least one peek-poller thread, and conditionally performing the checking and activating when none of the peek-poller threads has performed the checking and activating for a long delay time.

* * * * *